(12) United States Patent
Buntz et al.

(10) Patent No.: US 8,157,323 B2
(45) Date of Patent: Apr. 17, 2012

(54) SEAT OCCUPANCY DETECTION UNIT

(75) Inventors: Oliver Buntz, Ludwigshafen (DE);
Soeren Lemcke, Gaienhofen-Gundhoizen (DE)

(73) Assignee: TRW Automotive GmbH, Alfdorf (DE)

( * ) Notice: Subject to any disclaimer, the term of this patent is extended or adjusted under 35 U.S.C. 154(b) by 147 days.

(21) Appl. No.: 12/672,636

(22) PCT Filed: Aug. 5, 2008

(86) PCT No.: PCT/EP2008/006422
§ 371 (c)(1),
(2), (4) Date: Feb. 8, 2010

(87) PCT Pub. No.: WO2009/021653
PCT Pub. Date: Feb. 19, 2009

(65) Prior Publication Data
US 2011/0227380 A1 Sep. 22, 2011

(30) Foreign Application Priority Data
Aug. 10, 2007 (DE) .................. 10 2007 037 819

(51) Int. Cl.
B60N 2/02 (2006.01)
B60N 2/04 (2006.01)
B60N 2/06 (2006.01)
B60N 2/12 (2006.01)
B60N 2/16 (2006.01)
B60N 2/18 (2006.01)
B60N 2/20 (2006.01)
B60N 2/22 (2006.01)

(52) U.S. Cl. .................... 297/217.2; 297/217.3
(58) Field of Classification Search ............... 297/217.2, 297/217.3
See application file for complete search history.

(56) References Cited

U.S. PATENT DOCUMENTS

| | | | | |
|---|---|---|---|---|
| 4,700,974 A * | 10/1987 | Andres et al. | ............... | 280/806 |
| 4,924,162 A * | 5/1990 | Sakamoto et al. | ......... | 297/284.9 |
| 4,943,087 A * | 7/1990 | Sasaki | ............ | 280/804 |
| 4,995,640 A * | 2/1991 | Saito | .............. | 280/804 |
| 5,004,967 A * | 4/1991 | Ogasawara | ............ | 318/568.1 |
| 5,407,244 A * | 4/1995 | Nakano et al. | ............ | 296/68.1 |
| 5,473,313 A * | 12/1995 | Graebe, Jr. | .................... | 340/626 |
| 5,507,554 A * | 4/1996 | Nakano et al. | ........... | 297/216.13 |
| 5,625,914 A * | 5/1997 | Schwab | ............. | 5/690 |
| 5,752,299 A * | 5/1998 | Vivacqua et al. | ............... | 24/633 |
| 6,088,642 A * | 7/2000 | Finkelstein et al. | ............. | 701/49 |
| 6,409,265 B1* | 6/2002 | Koerlin et al. | ................ | 297/325 |
| 6,485,058 B1* | 11/2002 | Kohlndorfer et al. | ........ | 280/808 |
| 6,520,541 B1* | 2/2003 | Cantor | ........ | 280/801.1 |
| 6,588,792 B1* | 7/2003 | Koerlin et al. | ............. | 280/650 |
| 6,669,234 B2* | 12/2003 | Kohlndorfer et al. | ...... | 280/801.1 |
| 6,715,784 B2* | 4/2004 | Koerlin et al. | ............... | 280/650 |
| 6,767,029 B2* | 7/2004 | Jaudouin et al. | ............ | 280/735 |
| 6,976,699 B2* | 12/2005 | Koerlin | ............ | 280/650 |
| 2004/0195875 A1* | 10/2004 | Skelly | ........ | 297/217.3 |

* cited by examiner

*Primary Examiner* — Rodney B White
(74) *Attorney, Agent, or Firm* — Tarolli, Sundheim, Covell & Tummino LLP

(57) ABSTRACT

A seat occupancy detection unit (10) has at least one sensor (12) which has a reed switch (14) and a magnet (22) movable relative thereto in a switching direction (z). The seat occupancy detection unit (10) can be inserted in the seat padding of a vehicle seat, It is used to produce a warning signal for the wearing of a seat belt.

11 Claims, 2 Drawing Sheets

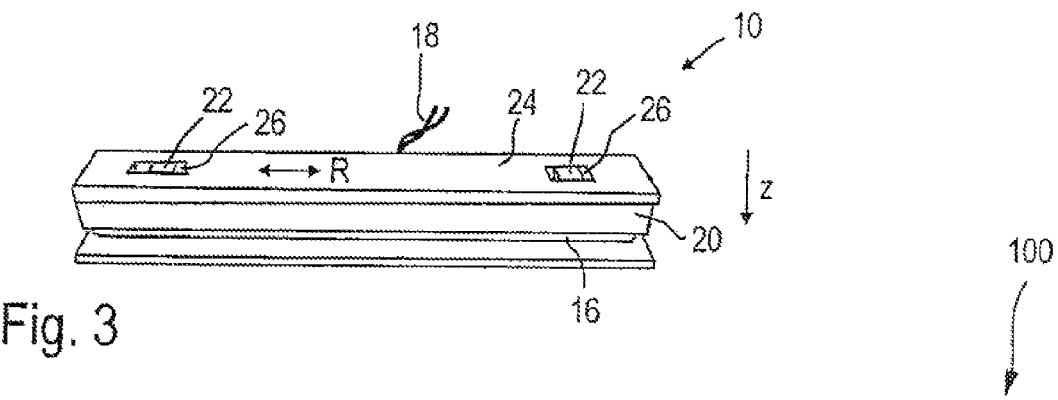
Fig. 3
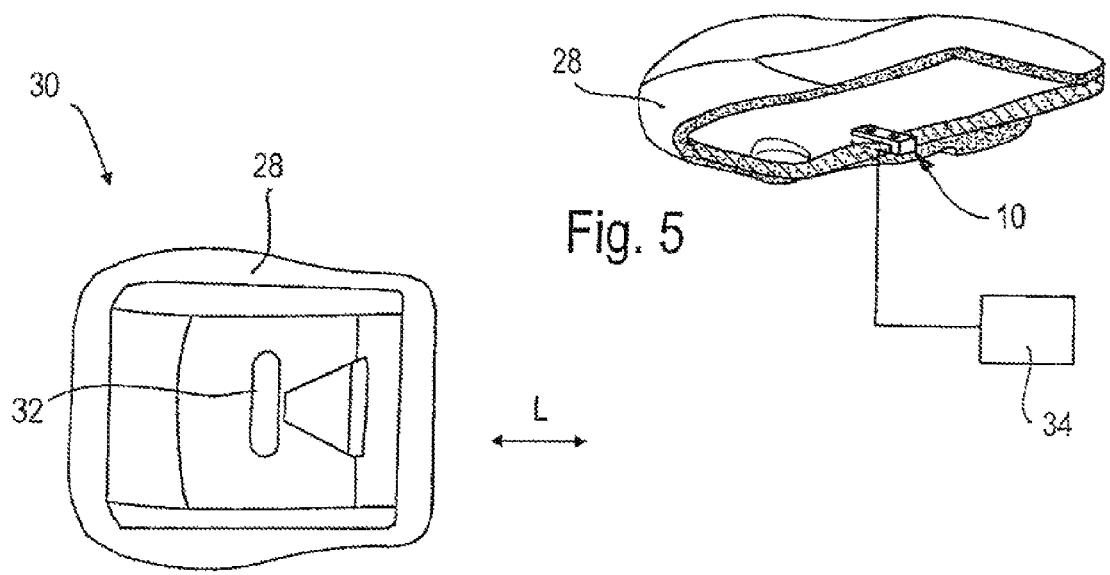
Fig. 4
Fig. 5
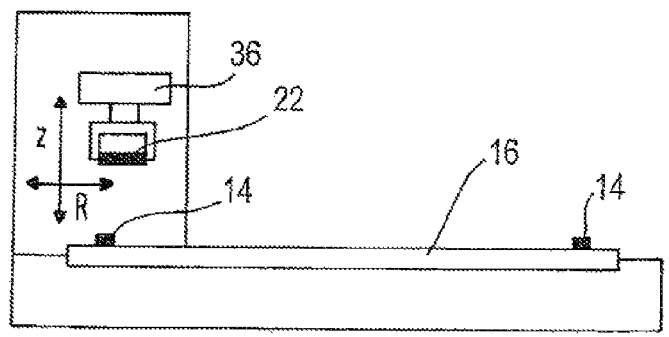
Fig. 6

SEAT OCCUPANCY DETECTION UNIT

FIELD OF THE INVENTION

The invention relates to a seat occupancy detection unit.

BACKGROUND OF THE INVENTION

Seat occupancy detection is used for a variety of purposes in passenger vehicles. This includes for example the systematic activation of occupant protection systems such as gas bag modules or belt tensioners. Here, on the basis of the differentiation between an occupied and an unoccupied seat, the safety systems can be systematically activated only for the occupied seats in the case of an accident, which saves resources. Another case of application for seat occupancy detection is to serve as one of the detection sensors for monitoring the wearing of a seat belt.

Such units are arranged for example in the seat padding and are activated by loading with the weight of the vehicle occupant.

SUMMARY OF THE INVENTION

It is an object of the invention to provide a simple and reliable seat occupancy detection unit.

This is achieved in that the seat occupancy detection unit comprises at least one sensor which has a reed switch and a magnet which is movable relative thereto in a switching direction. Due to their construction, reed switches are very robust and have a long service life, and are able to be used reliably over the wide temperature range possibly occurring in a vehicle which is to be covered. In addition, they are favourable to produce, so that they are also suitable for series use.

Preferably, an elastic, compressible foam layer is arranged between the reed switch and the magnet. The foam layer can consist of the same material as the remainder of the seat padding of the vehicle seat or of a material similar thereto. The foam layer provides a sufficient resistance when the seat is not loaded, in order to serve as a spacer between the magnet and the reed switch, and at the same time provides a sufficiently great restoring force, in order to move the magnet back into its initial position after the seat has been relieved of load. In addition, this construction makes provision that the sensor in the seat is not perceived as a foreign body.

Preferably, two sensors are provided in the seat occupancy detection unit, in order to ensure a sufficient quality of detection. However, it is also possible to only use one sensor or more than two sensors.

The two reed switches of the sensors can be arranged on a shared support, for example a conventional printed circuit board. The remaining electronics necessary for the sensor can also be arranged on this support.

In a preferred embodiment of the invention, the magnet is inserted into a recess in a foam layer. The magnet can be secured in the recess only by clamping and without further means or by means of suitable holding elements. The foam layer can be an independent foam layer which only receives the magnet(s) of one or of several adjacent sensors, but can also be part of a foam layer which separates the magnet and reed switch from each other.

Externally, the sensor is advantageously substantially delimited by a foam layer so that it can be integrated into a seat padding as a component which disturbs the seating comfort as little as possible. A protective layer of a foam material is preferably arranged here on the rear side of the support.

The magnet can be mounted so as to be adjustable in a direction perpendicular to the switching direction, which allows the sensitivity of the seat occupancy detection unit to be adjusted simply and systematically exactly to the respective purpose of use. A switching point of the reed switch can be set through this adjustment.

If a vehicle seat is provided with a seat padding, a recess can be provided in the seat padding into which the seat occupancy detection unit is inserted. This recess can be pre-fabricated for example during the foaming of the seat padding. The mounting of the seat occupancy detection unit can thus be limited to the insertion of the pre-fabricated unit of sensors and foam layers into a recess which is already pre-fabricated during the manufacture of the seat padding. Further steps such as glueing or foaming around the seat occupancy detection unit can be dispensed with. However, on the other hand it would of course also be possible to foam in the unit of reed switch and magnet into the seat padding during manufacture.

A preferred purpose of use of the described seat detection unit is to be found in vehicle occupant protection systems with an arrangement to detect the wearing of a belt, in which the signal of the sensor is used in this case to activate a warning signal when the seat is detected as being occupied and the belt is detected as not being worn. In this case, the vehicle occupant is given a warning for example to put on the belt when the vehicle is moved.

BRIEF DESCRIPTION OF THE DRAWINGS

Further features and advantages of the invention will be apparent from the following description of an example embodiment in connection with the enclosed drawings, in which:

FIG. 3 shows a diagrammatic perspective view of a seat occupancy detection unit according to the invention;

FIG. 4 shows an illustration of a seat padding with a pre-fabricated recess for a seat occupancy detection unit according to the invention;

FIG. 5 shows a perspective view, partially in section, of a seat padding of a vehicle seat according to the invention with a seat occupancy detection unit embedded into the seat padding; and FIG. 6 shows a diagrammatic illustration of the adjustment of a magnet of a seat occupancy detection unit according to the invention.

DESCRIPTION OF PREFERRED EMBODIMENTS

Figure 1:
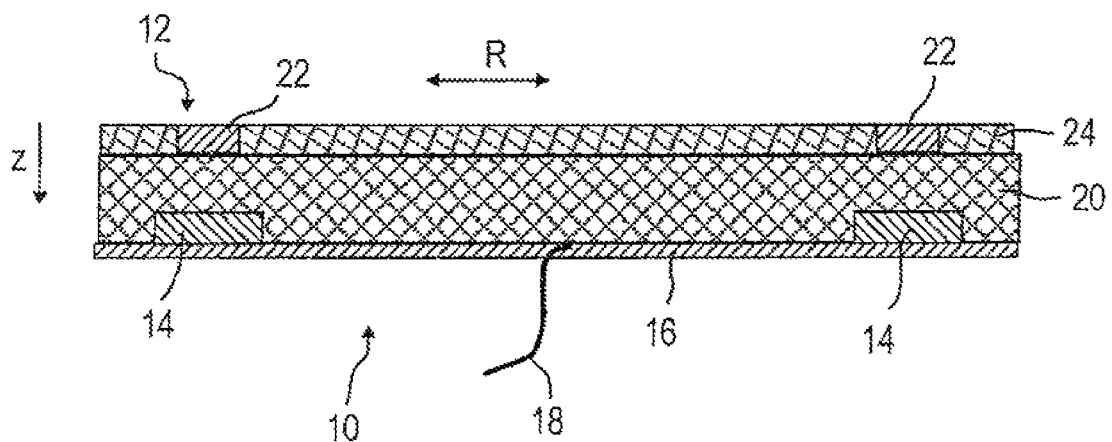
FIG. 1 shows a diagrammatic sectional view of a seat occupancy detection unit according to the invention.

FIG. 1 shows a seat occupancy detection unit 10, with two sensors 12 arranged at a distance from each other. However, only one sensor or more than two sensors 12 could also be provided in the seat occupancy detection unit 10. Each of the two sensors 12 has a reed switch 14 in accordance with a suitable, conventionally known type of construction.

The two reed switches 14 are fastened and contacted spaced apart from each other on a shared support 16, here a printed circuit board. The distance between the two reed switches 14 is preferably between 5 and 20 cm, here approximately 15 cm. In the centre between the two reed switches 14, an electric lead 18 is guided away from the support 16, to connect the seat occupancy detection unit 10.

The two reed switches 14 are embedded into an elastically compressible foam layer 20 which completely covers the support 16 on the switch side. The rear side of the support 16 is free of foam.

Magnets 22 lie on the foam layer 20, respectively over the reed switches 14, with one magnet 22 being associated respectively with one of the reed switches 14. The foam layer is compressible reversibly in a switching direction z which lies substantially perpendicularly to the support 16 and corresponds to the direction of loading by the occupant. When the load ceases, the foam layer 20 relaxes again and moves the magnet 22 back into its initial position.

The two magnets 22 are held in a further shared foam layer 24, by corresponding recesses 26 being provided in the foam layer 24. This is illustrated in FIG. 3.

Figure 2:
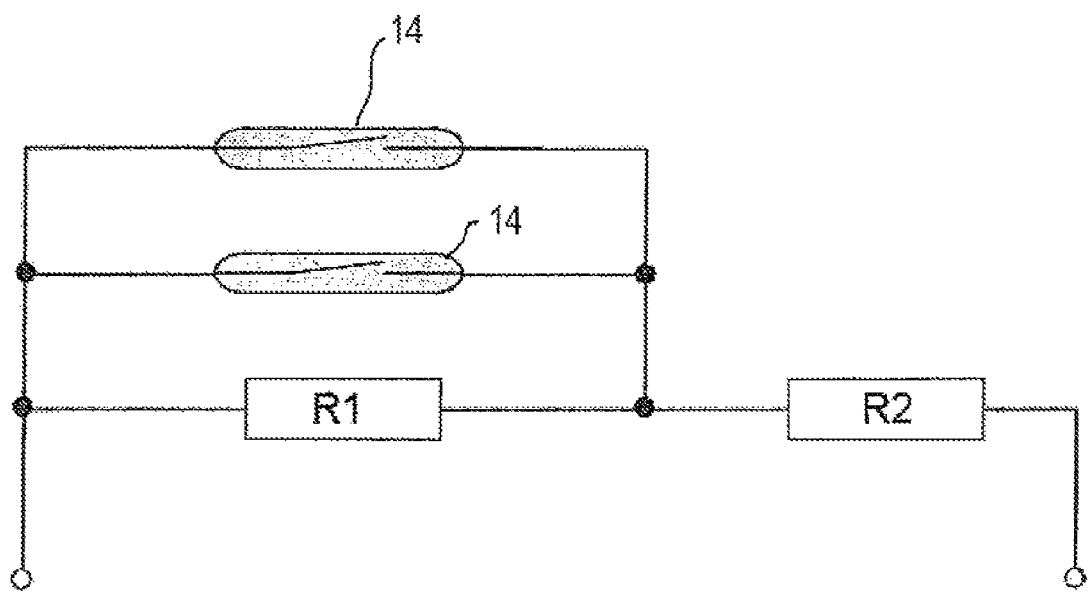
FIG. 2 shows a schematic circuit diagram of a seat occupancy detection unit according to the invention.

The wiring of the assembly shown in FIG. 1 is illustrated diagrammatically in FIG. 2. The two reed switches 14 are connected parallel to each other and parallel to a first resistance R1. The sensitivity of the circuit can be set to a wide extent by means of this resistance and a resistance R2 connected in series with this group. An occupancy of the seat is detected when one of the two sensors 12 emits a signal, i.e. when one of the two magnets 22 has moved close to its associated reed switch 14 to such an extent that the latter connects.

When a vehicle occupant sits down onto the vehicle seat 30, then the seat padding 28 is loaded in switching direction z. The foam layer 20 is compressed and the magnet 22 reduces its distance, in the switching direction z, from the reed switch 14 which is associated with it. At a particular distance, the switching point of the reed switch 14 is reached, at which the magnetic field of the magnet 22 has a sufficient intensity to move the (magnetically deflectable) contact tongue of the reed switch 14 and to close the switch. In this case, a switching signal is produced, which is passed on via the lead 18 to a control unit (not shown). When the vehicle occupant leaves the seat 30, the foam layer 20 relaxes, the magnet 22 moves away from the reed switch 14 again. When it has again exceeded the distance for connecting the reed switch 14, the reed switch 14 opens again, and the signal ends.

The assembly shown in FIG. 1 is substantially surrounded by foam. A thin layer of foam is fastened here as a protective layer on the rear side of the support 16. The materials of the foam layers 20,24 can be selected so be similar or identical here to that of a seat padding 28 of a vehicle seat 30, which is shown diagrammatically in FIGS. 4 and 5.

During the manufacture of the seat padding 28, a recess 32 is pre-fabricated, for example by a corresponding form of a foaming tool, which corresponds in its dimensions to the seat occupancy detection unit 10. The seat occupancy detection unit 10 is simply inserted into the recess 32, with the support 16 pointing downwards, i.e. directed away from the future seat surface. Preferably, no further fastening is carried out, but a glueing or welding connection could also take place.

The detection of occupancy of a seat by a person is very favourable at this location. In FIG. 5, the seat padding 28 with the inserted seat occupancy detection unit 10 is shown in a view partially in section. The seat occupancy detection unit 10 is installed transversely to the longitudinal direction L of the vehicle seat 30, and namely in the centre of the seat padding 28.

In FIG. 5, the use of the described seat occupancy detection unit 10 in a vehicle occupant protection system 100 is also shown diagrammatically. In co-operation with an arrangement 34 to detect whether a belt is being worn (only indicated in FIG. 5), a belt-wearing warning signal is obtained from the sensor signals of the seat occupancy detection unit 10. The warning signal is generated when it is detected that the vehicle seat 30 is occupied (by a person) and, at the same time, it is detected that the safety belt (not shown) belonging to this vehicle seat 30 is not being worn. This warning signal can be acoustic, visual or haptic in nature.

The magnets 22 are displaceably mounted in a direction R perpendicular to the switching direction z in their respective recess 26 in the foam layer 24. For this purpose, the recess 26 is formed larger than the extent of the magnet 22 in the direction R. In this example, the direction R extends in line with the two reed switches 14.

The switching point of the reed switch 14 can be set by the magnet 22 being displaced perpendicularly to the switching direction z in the direction R. Depending on the position of the magnet 22 to the contact tongue of the reed switch 14, the distance is increased or reduced which the magnet 22 has to have from the reed switch 14 in the switching direction z, in order to connect it.

This adjustment may take place automatically by an adjusting tool 36 which is illustrated in FIG. 6. The adjusting tool 36 here grasps the corresponding magnet 22 and firstly approaches a zero point predetermined by the position of the reed switch 14. This initial value is stored. The adjusting tool 36 now approaches a point which lies a distance away from the zero point in the direction R. At this location, the switching point of the reed switch 14 is determined by a movement in the switching direction z. The position and switching point are stored. In this example, the starting point in the switching direction z is set at a predetermined height and is preferably constant.

The adjusting tool 36 repeats this procedure for various points along the direction R, preferably both to the right and also to the left of the zero point. The switching speed, i.e. the speed of the movement in direction z, is preset, for example at approximately 15 mm/s.

When a position is reached in which the switching point of the reed switch 14 is reached in the predetermined switching distance, this position is stored.

As shown in FIG. 6, the establishing of the position of the magnet 22 in the direction R takes place preferably before the foam layers 20, 24 are applied onto the support 16. As the optimum position of the magnet 22 was stored, which was determined during the adjustment process, the magnet can be mounted in exactly the desired position after the application of the foam layers 20, 24 onto the support 16 in the recess 26.

The magnets 22 can be held at the predetermined location in the recesses 26 solely by clamping, or by suitable (preferably reversibly releasable) means, so that a readjustment is possible. The seat occupancy detection unit 10 is situated relatively far inside the foam of the seat padding 28, so that there is no danger that the seating climate is affected or the seating comfort for the occupant is impaired.

The seat occupancy detection unit 10 can also be integrated simply into already existing vehicle seats and seating designs, because its switching parameters are able to be set easily and are also subsequently adjustable.

The invention claimed is:

1. A seat occupancy detection unit, with at least one sensor (12) which has a reed switch (14) and a magnet (22) movable relative thereto in a switching direction (z), wherein an elastically compressible foam layer (20) is arranged between the reed switch (14) and the magnet (22).

2. The seat occupancy detection unit according to claim 1, wherein two sensors (12) are provided.

3. The seat occupancy detection unit according to claim 2, wherein the reed switches (14) are arranged on a shared support (16).

4. A seat occupancy detection unit, with at least one sensor (12) which has a reed switch (14) and a magnet (22) movable relative thereto in a switching direction (z), wherein the magnet (22) is inserted into a recess (26) of a foam layer (24).

5. A seat occupancy detection unit, with at least one sensor (12) which has a reed switch (14) and a magnet (22) movable relative thereto in a switching direction (z), wherein the sensor (12) is delimited substantially by a foam layer (20, 24).

6. A seat occupancy detection unit, with at least one sensor (12) which has a reed switch (14) and a magnet (22) movable relative thereto in a switching direction (z), wherein the magnet (22) is mounted so as to be adjustable in a direction (R) perpendicular to the switching direction.

7. The seat occupancy detection unit according to claim 6, wherein a switching point of the reed switch (14) is able to be set by the adjustment of the magnet (22).

8. The seat occupancy detection unit according to claim 1, wherein the switching direction (z) corresponds to a direction of loading.

9. A vehicle seat with a seat occupancy detection unit, with at least one sensor (12) which has a reed switch (14) and a magnet (22) movable relative thereto in a switching direction (z), wherein the vehicle seat (30) has a seat padding (28) and a recess (32) is provided in the seat padding (28) into which the seat occupancy detection unit (10) is inserted.

10. The vehicle seat according to claim 9, wherein the recess (32) is pre-fabricated during the foaming of the seat padding (28).

11. A vehicle occupant protection system with a seat occupancy detection unit (10) according to claim 1, wherein an arrangement (34) to detect that a belt is being worn, in which the signal of the sensor (12) is used to activate a warning signal in the case where the vehicle seat (30) is detected as being occupied and the belt is detected as not being worn.

* * * * *